Figures 1, 2:
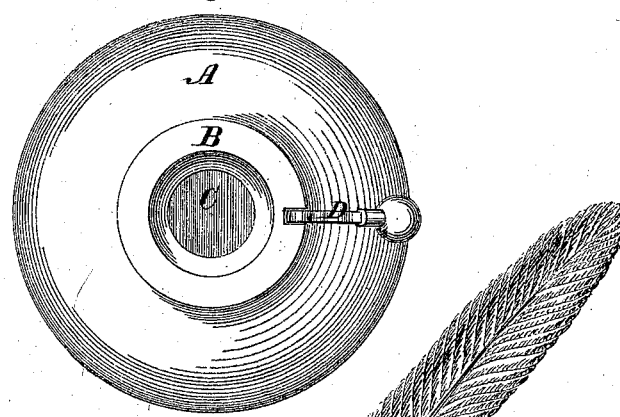

W. F. JONES.
Inkstand.

No. 128,630.  Patented July 2, 1872.

WITNESSES.  INVENTOR.

UNITED STATES PATENT OFFICE.

WILLIAM FRANKLIN JONES, OF CIRCLEVILLE, OHIO.

IMPROVEMENT IN INKSTANDS.

Specification forming part of Letters Patent No. 128,630, dated July 2, 1872.

Specification of an Improvement in Inkstands, invented by WILLIAM FRANKLIN JONES, of Circleville, in the county of Pickaway, State of Ohio.

The invention relates to an inkstand with a delicately-poised lid, which has a slight tendency to close itself, but which opens readily by the pressure of the pen, and closes after the pen is withdrawn, so as to exclude dust and insects and prevent evaporation, the lid being horizontal and closed by the reaction of a counterpoised arm, D.

In the drawing, Figure 1 is a top view or plan. Fig. 2 is a vertical central section.

A is an inkstand, which may be of any convenient size and shape. B is an annular cap or ring for the top; and C is a hinged lid, which is closed automatically by a counterpoised arm, D. The lid, which is so delicately poised that it yields to the pressure of a pen without injuring the nib, opens downwardly, as shown in Fig. 2. As the pen is raised the edge of the lid may wipe from it superfluous ink. As soon as the pen is withdrawn the counterpoised arm D raises the lid, thereby excluding insects and dust and preventing evaporation.

I am aware that springs and counter-weights have heretofore been used for the same purpose as in my invention, but situated on the inside of an inkstand, and I therefore lay no claim to such when arranged in the interior of an inkstand, as such devices are liable to become clogged and corroded by the action of the ink, and hence inoperative; but—

What I do claim as new, and desire to secure by Letters Patent, is—

As a new article of manufacture, an inkstand having a hinged horizontal lid, C, pivoted in its cap or rim B, said lid opening inwardly, and counterpoised and closed automatically by an arm, D, arranged on the outside of the inkstand, as set forth.

WILLIAM FRANKLIN JONES.

Witnesses:
GEO. H. FICKARDT,
CHAS. M. SIEBERT.